(12) United States Patent
Struhs et al.

(10) Patent No.: US 9,875,003 B2
(45) Date of Patent: Jan. 23, 2018

(54) METHOD AND APPARATUS FOR PROVIDING A USER INTERFACE

(75) Inventors: Stefan Struhs, Braunschweig (DE); Mark Pleschka, Berlin (DE); Oliver Meyer, Ingolstadt (DE); Stefan Schulz, Berlin (DE); Silvio Federau, Berlin (DE)

(73) Assignee: VOLKSWAGEN AG, Wolfsburg (DE)

( * ) Notice: Subject to any disclaimer, the term of this patent is extended or adjusted under 35 U.S.C. 154(b) by 544 days.

(21) Appl. No.: 14/124,392

(22) PCT Filed: Jun. 11, 2012

(86) PCT No.: PCT/EP2012/002474
§ 371 (c)(1),
(2), (4) Date: Feb. 28, 2014

(87) PCT Pub. No.: WO2012/167952
PCT Pub. Date: Dec. 13, 2012

(65) Prior Publication Data
US 2014/0229876 A1    Aug. 14, 2014

(30) Foreign Application Priority Data
Jun. 10, 2011   (DE) .................. 10 2011 103 869

(51) Int. Cl.
*G06F 3/048* (2013.01)
*G06F 3/0484* (2013.01)
(Continued)

(52) U.S. Cl.
CPC ...... *G06F 3/04842* (2013.01); *G01C 21/3611* (2013.01); *G01C 21/3682* (2013.01); *G06F 3/0482* (2013.01)

(58) Field of Classification Search
None
See application file for complete search history.

(56) References Cited

U.S. PATENT DOCUMENTS

2006/0271280 A1* 11/2006 O'Clair ............... G06F 17/3087
                                                                 701/455
2009/0112816 A1*  4/2009 Marlow ............. G06F 17/30241
                                           (Continued)

FOREIGN PATENT DOCUMENTS

DE      19929425 A1    12/2000
DE      10313222 A1    12/2003
(Continued)

OTHER PUBLICATIONS

Office Action for Korean Patent Application No. 10-2013-7033609; dated Mar. 10, 2015.
(Continued)

*Primary Examiner* — William Trapanese
(74) *Attorney, Agent, or Firm* — Barnes & Thornburg LLP

(57) ABSTRACT

A method for providing a user interface in which a set of objects stored in the form of data is displayed as a sequential list. The method involves each of the objects being allocated a position in a graphical presentation displayed in addition to the sequential list, the position being taken as a basis for displaying the objects in the graphical presentation. A first user action selects a position in the graphical presentation, and the selected position is taken as a basis for selecting a subset from the displayed set of objects in the sequential list. The positions in the graphical presentation are allocated a metric, wherein it is possible to ascertain a measure of distance between two positions, and an object is included in the subset on the basis of the measure of distance between the position associated with the respective object and the selected position.

19 Claims, 3 Drawing Sheets

(51) Int. Cl.
*G01C 21/36* (2006.01)
*G06F 3/0482* (2013.01)

(56) References Cited

U.S. PATENT DOCUMENTS

| | | | | |
|---|---|---|---|---|
| 2009/0150073 A1* | 6/2009 | Caraballo | G01C 21/3682 | 701/414 |
| 2009/0177381 A1* | 7/2009 | Taniguchi | G01C 21/3679 | 701/454 |
| 2010/0094548 A1* | 4/2010 | Tadman | G01C 21/36 | 701/533 |
| 2011/0099180 A1* | 4/2011 | Arrasvuori | G01C 21/3679 | 707/754 |
| 2011/0153186 A1* | 6/2011 | Jakobson | G01C 21/20 | 701/532 |
| 2012/0268485 A1* | 10/2012 | Icho | G06K 9/00476 | 345/629 |
| 2013/0055168 A1* | 2/2013 | Shiroor | G06F 3/0488 | 715/863 |
| 2013/0169673 A1* | 7/2013 | Garrett | G06F 17/30241 | 345/629 |

FOREIGN PATENT DOCUMENTS

| | | |
|---|---|---|
| DE | 102005042694 A1 | 7/2006 |
| DE | 102006051331 A1 | 5/2008 |
| DE | 102008008948 A1 | 8/2009 |
| JP | 2005331511 A | 12/2005 |
| JP | 2007139502 A | 6/2007 |
| WO | 0169592 A1 | 9/2001 |
| WO | 03100351 A1 | 12/2003 |
| WO | 2010057531 A1 | 5/2010 |

OTHER PUBLICATIONS

Search Report for German Patent Application No. 10 2011 103 869.1; dated Dec. 27, 2011.
Search Report and Written Opinion for International Patent Application No. PCT/EP2012/002474; dated Sep. 27, 2012.
Office Action for Korean Patent Application No. 10-2015-7034813; dated Oct. 4, 2016.

* cited by examiner

METHOD AND APPARATUS FOR PROVIDING A USER INTERFACE

PRIORITY CLAIM

This patent application is a U.S. National Phase of International Patent Application No. PCT/EP2012/002474, filed 11 Jun. 2012, which claims priority to German Patent Application No. 10 2011 103 869.1, filed 10 Jun. 2011, the disclosures of which are incorporated herein by reference in their entirety.

SUMMARY

The present disclosure relates to a method for providing a user interface, in which a set of objects stored as data is displayed as a sequential list. The method involves the objects being in each case allocated a position in a graphical presentation displayed in addition to the sequential list, in dependence on which position the objects are displayed in the graphical presentation. A position in the graphical presentation is selected by a first operating action, and in dependence on the selected position, a subset from the displayed set of the objects is selected in the sequential list. The present disclosure also relates to an associated apparatus for providing such a user interface, particularly in a vehicle.

BRIEF DESCRIPTION OF THE DRAWINGS

The present disclosure will now be explained in greater detail with reference to the figures, in which.

DETAILED DESCRIPTION OF THE DISCLOSED EMBODIMENTS

Figure 1:
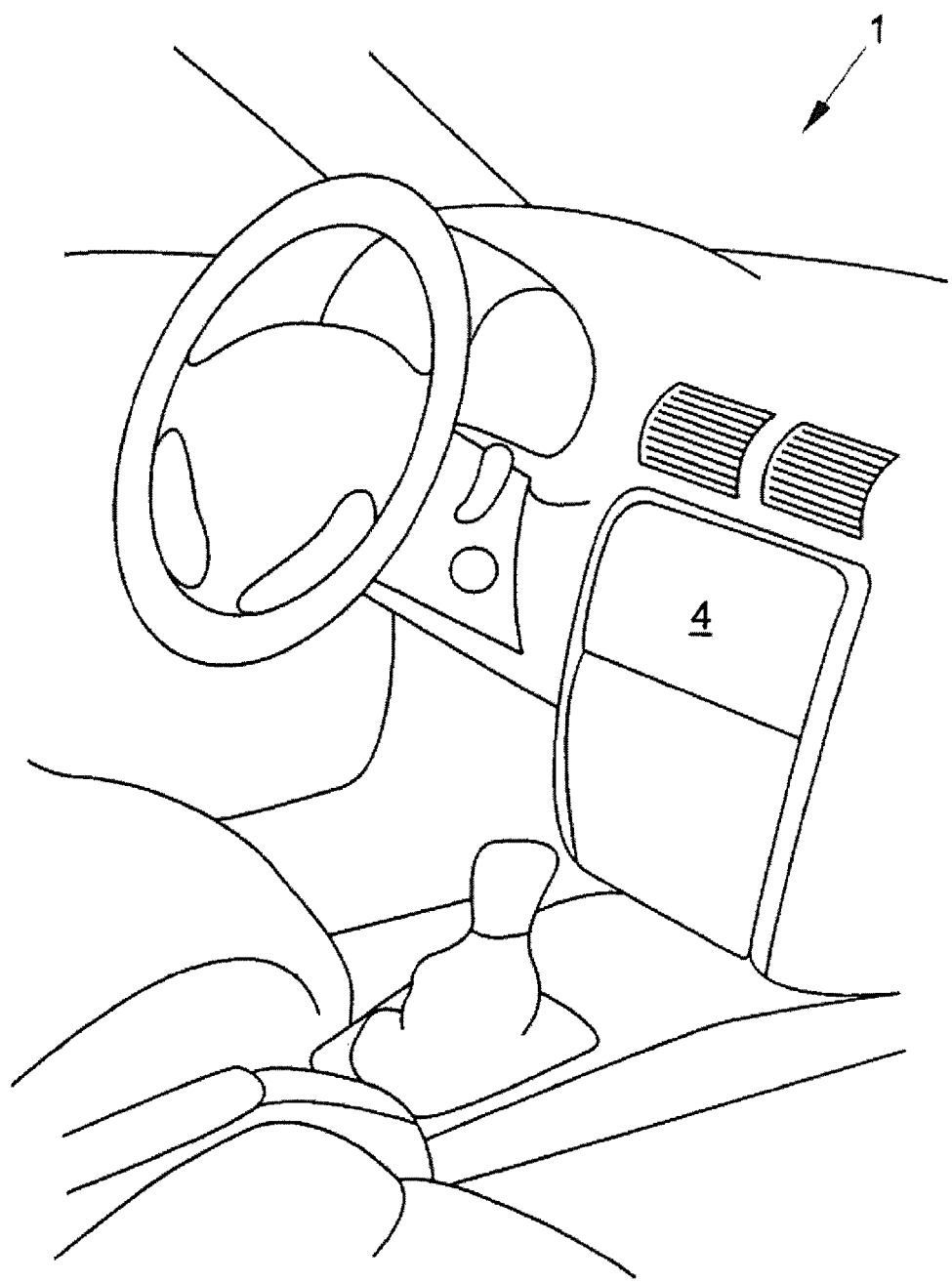
FIG. 1 shows a view of a cockpit of a vehicle having an apparatus for providing a user interface according to a disclosed embodiment.

Illustrative embodiments provide a method and an apparatus in which comfortable and intuitive operation for selecting an object from a multiplicity of search results is provided for.

The method provides a metric that is allocated to the positions in the graphical presentation so that a measure of distance can be determined between two positions, and an object is included in the subset in dependence on the measure of distance between the position belonging to the respective object and the selected position. This selection of the subset is especially intuitive because the user only needs to concentrate on a point of the graphical presentation which can be found by the user visually easily. The user does not need to select an area of the graphical presentation. This can be determined automatically in dependence on the metric of the positions by the system. The bothersome searching by leafing or scrolling through a sequential list is also omitted. Furthermore, it is not required to hit a particular object shown graphically precisely.

In this context, the graphical presentation is typically a spatial visualization of data. In particular, it can be presented in a two-dimensionally simple manner on a display surface. However, it can also represent a three-dimensional space by the presentation of virtual planes or be formed by topological subsets of this space, e.g. by a line on a surface.

A sequential list is an arrangement of objects, the parameter for arrangement of which is determined by a continuous order number. The sequential list is, for example, a table listing or an enumeration in which the objects enumerated are displayed at equidistant intervals independently of the actual object properties such as, e.g., positions allocated to the objects. It can be a list with text entries or a list with symbols which symbolize the respective objects. E.g., it is a presentation, known per se, of file structures such as are commonly used in the field of data processing, for example so-called icon lists, thumbnails or preview lists.

An object is included in the subset when the measure of distance is smaller than a predetermined limit value. In this manner, the subset can be restricted rapidly to an area around the selected position. Alternatively, the inclusion in the subset can also depend on the measure of distance in another way, for example if the measure of distance is greater than a predetermined limit value or is within a particular range of values. Depending on the application, the selection of such a subset can be appropriate, e.g., if a point of congestion is to be bypassed as widely as possible or a search is to be restricted to objects outside a city.

In at least one disclosed embodiment of the method, objects are included in the subset in ascending order of the measure of distance between the position of the object and the selected position until a predetermined number is reached. By this means, the subset of the search results can be restricted to a measure determined in advance, e.g. a number between 3 and 10, so that the sequential list displayed on the basis of this subset becomes manageable.

The sequential list can then be displayed sorted in an arbitrary manner. Since the selection is most intuitive in the graphical presentation via the metric forming the basis, the sequential list can be displayed, in particular, sorted alphabetically after the selection of the subset. Whilst the handling of relatively large sequential lists in alphabetic order can cause a considerable search effort by turning pages or scrolling, handling a shorter sequential list in alphabetic order may be much simpler than a sequential list sorted in accordance with the measure of distance because the measure of distance loses its intuitive relation to the graphical presentation in the sequential list.

In at least one disclosed embodiment of the method, the scale of presentation of the graphical presentation is adapted automatically to the subset of the objects. E.g., it is possible to perform automatic scaling, particularly an enlargement of the map, which visually optimizes the graphical presentation. By this means, it may be possible to represent objects located very closely next to one another in an undistorted manner. The new center of the graphic display is typically the selected position. An adaptation of the graphical presentation to the subset of the objects can furthermore also comprise a recentering of the graphical presentation. This is appropriate especially when the subset of the objects is located tendentially in one direction from the selected position.

The method steps mentioned last can also be performed in a multi-stage iteration process. For example, following an operating action for selecting a position on the graphical presentation, a relatively large number of objects is initially included in a first subset and in a subsequent step, the graphical presentation is adapted to this first subset. In a second iteration or further iterations, the user can correct or specify more precisely the selected position by means of a second operating action or further operation actions until the second subset obtained in this manner or further subsets can be restricted in number in such a manner that handling via the sequential list becomes comfortable and simple.

It is now possible, after a position has been selected in the graphical presentation by the first operating action, to select a displayed object of the subset in the sequential list by a second operation action. Depending on boundary conditions, the selection in a short sequential list can be simpler and more rapid than a selection in a graphical presentation. In this context, the sequential list can be focused on other parameters or attributes of the object than is the case in a graphical presentation. In the graphical presentation, a position or a visualization of an object class, e.g. symbols, can provide advantageously for a good overview and intuitive operation. Due to the presentation which is not linked to positions fixed in advance but to positions which are only determined as object parameters, this type of presentation is not optimized spatially, as a rule, however. In the case of a sequential list, in contrast, a multiplicity of information items relating to the corresponding object can be presented in a compact manner so that the selection from such a list is easier for the user due to the additional information.

The method can be applied to a multiplicity of search and selection programs. In particular, the objects can be navigation destinations of a navigation system or selection objects of an infotainment application in a vehicle. However, applications are also possible in which objects are to be sought in dependence on a number of parameters, e.g. price, duration or quantity, for example for searching for properties or for booking trips.

The measure of distance can comprise advantageously a distance and/or a calculated travelling time. In this context, the distance can be a geographic distance (linear distance) or a traffic-related distance, e.g. corresponding to a defined road network and/or a timetable. In particular, a number of these parameters can also be included in the measure of distance.

In at least one disclosed embodiment of the method, the graphical presentation and/or the sequential list are presented on a touch-sensitive display surface and the first and/or the second operating action is carried out by touching the display surface in the area in which the graphical presentation or the sequential list is displayed in each case. Using touch-sensitive display surfaces, also called touchscreens, makes the operation even more comfortable for the user. As an alternative, however, the selection can also take place via a mouse, a cursor or perhaps a joystick, for example.

The apparatus for providing a user interface comprises a data memory for storing a set of objects, a display surface for displaying graphical presentations and sequential lists and input means for detecting an operating action for selecting a position on the display surface. The apparatus also comprises a control unit which is connected to the data memory, the display surface and the input means, wherein the objects can be allocated in each case a position in a graphical presentation displayed additionally to the sequential list, by means of the control unit, in dependence on which position the objects can be displayed in the graphical presentation and a subset from the displayed set of the objects can be selected in the sequential list in dependence on the selected position. By means of the control unit, a metric can be allocated to the positions in the graphical presentation, so that a measure of distance can be determined between two positions, and an object can be included in the subset in dependence on the measure of distance between the position belonging to the respective object and the selected position. The apparatus is suited for performing the method. Thus, it also has the advantages of the method.

The input means can be implemented in various manners. They can be formed as a touch-sensitive surface on the display surface so that the graphical presentation and/or the sequential list can be operated via a touchscreen. As an alternative or else additionally, other input means can be provided such as, for example, rotary push-action controls, multidirectional rocker switches, a touchpad which also has a touch-sensitive surface but is spatially separate from the display surface, a mouse or a joystick.

A vehicle is furthermore equipped with such an apparatus for providing a user interface.

User interfaces are used for search functions on graphical user interfaces. In this context, displaying the objects with respect to a graphical presentation facilitates a rough orientation for the user when a multiplicity of search results have been determined, displaying the objects in a sequential list simplifying the handling in the actual selection of the object searched for once the set of the search results has been restricted.

In particular, a generic user interface is suitable for use in navigation systems to visualize ambiguous search results, e.g. navigation destinations or special targets in the vicinity of a navigation route and thus to facilitate the actual selection for the user. For example, it can also be used for searching for hotels or restaurants in a city or region, the orientation being facilitated for the user due to the position-linked presentation of the search results in a map and the user being able to restrict his search quickly to desired precincts or districts. However, they can furthermore also be used for other map-based search programs or search programs with a visual orientation aid such as, e.g., in the case of searching for a radio transmitter in which the frequency strip serves as a graphical orientation aid.

In this context, the problem of ambiguous search results can arise from an unambiguous search input having a number of hits or else from a non-unambiguous search input comprising hit proposals by the system.

In the case of a vehicle, both of the above-mentioned problems occur repetitively, which is why the illustrative embodiments are used advantageously in a vehicle. In particular, there are protracted operating actions in the selection and/or confirmation of navigation destinations which are found to be bothersome by the driver. There may also be faulty search inputs via a keyboard in the vehicle due to vehicle vibrations or search inputs via a voice interface may be detected erroneously because of the increased noise level by the system. Furthermore, it must be considered in the case of a vehicle that an operating action via the user interface should be performed as comfortably as possible so that the driver is not diverted from the road traffic during the operating action.

In disclosed embodiments, applications for a navigation system 2 in a vehicle 1 are described. However, the embodiments can be used for other functional units in the vehicle 1 or else in stationary systems without reference to a vehicle. The illustrative embodiments can be used for all technical fields in which graphical user interfaces, particularly search engines having long hit lists, are used. The illustrative embodiments are advantageous when a user has to select an entry from a long list and the entries themselves can be linked to a graphical presentation. Such graphical presentations are not only maps in which the geographic position establishes the reference to the graphical presentation, but also graphical presentations depending on arbitrary parameters, e.g. a frequency strip for selecting a radio transmitter.

FIG. 1 shows a cockpit of a vehicle 1 which is equipped with an apparatus for providing a user interface according to an illustrative embodiment. A display surface 4 is arranged in the upper area of the center console so it can be viewed well by the driver and passenger and, if necessary, can be operated.

Figure 2:
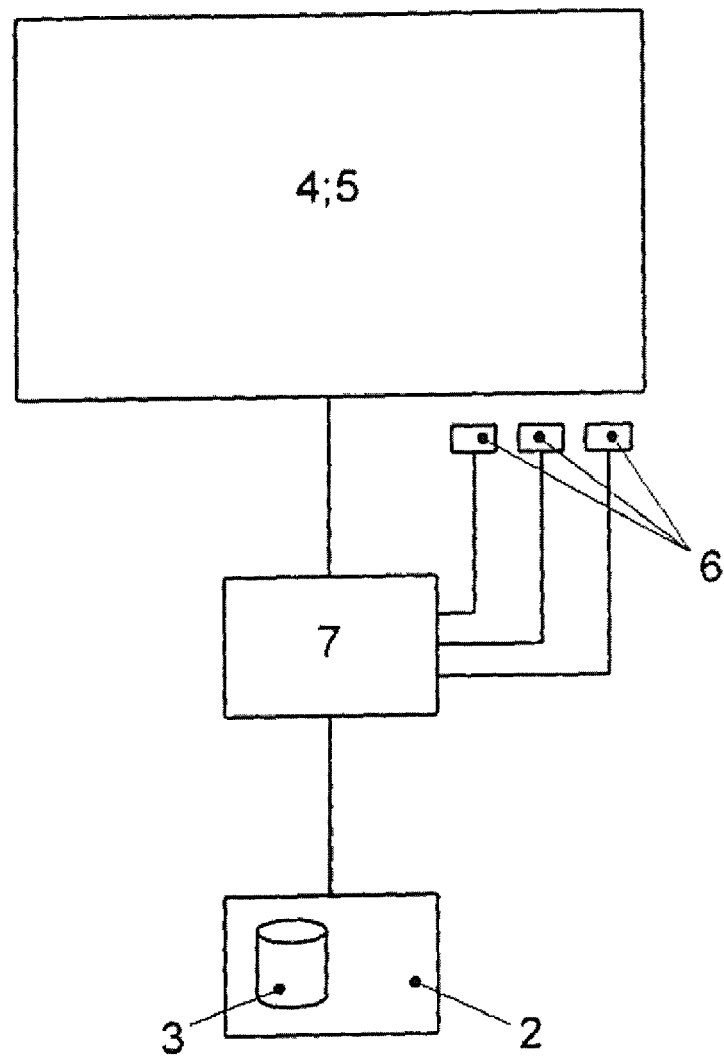
FIG. 2 shows diagrammatically the basic construction of an apparatus for providing a user interface according to a disclosed embodiment.

FIG. 2 shows diagrammatically the structure of such an apparatus for providing a user interface in a vehicle 1. In the example shown, the display surface 4 is embodied as a touchscreen and has a touch-sensitive surface 5 as an input means. In this manner, an operating action by touching the display contents shown on the display surface 4 can be detected. As an alternative or else additionally, further input means 6 can be provided such as, e.g., pushbuttons, rotary push-action controls or so-called touchpads which are mounted in the vicinity of the display surface 4 or at a suitable position so that they can be operated easily by the driver or passenger. In particular, operating actions as will still be explained in greater detail further below in conjunction with the method can be detected via the touch-sensitive surface 5 and/or the further input means 6.

The display surface 4 and the various input means 5, 6 are connected to a control unit 7 which, in turn, is connected to a navigation system 2 or other functional units (not shown). The navigation system 2 comprises a data memory 3 in which a set of objects 11A-11E, 11A'-11E', 11X is stored as data.

The objects 11A-11E, 11A'-11E', 11X are allocated to a category of navigation data. They are, for example, cities or villages. However, they can also be, e.g., special targets, for example railroad stations, shopping centers, sports installations, restaurants and the like, where the objects can also be linked to one another (e.g. city with railway station). To the objects 11A-11E, 11A'-11E', 11X, a number of attributes are allocated which are also stored in the data memory 3. These attributes comprise, e.g., place name, street name, zip code, county and federal state. An object can also be allocated to a particular category, e.g. whether this is a village or a city. Furthermore, the objects 11A-11E, 11A'-11E', 11X are in each case allocated a geographic position with the aid of which they can be displayed at their allocated positions on a map 8 on the display surface 4, as will still be explained in greater detail below in conjunction with the method.

Figure 3A:
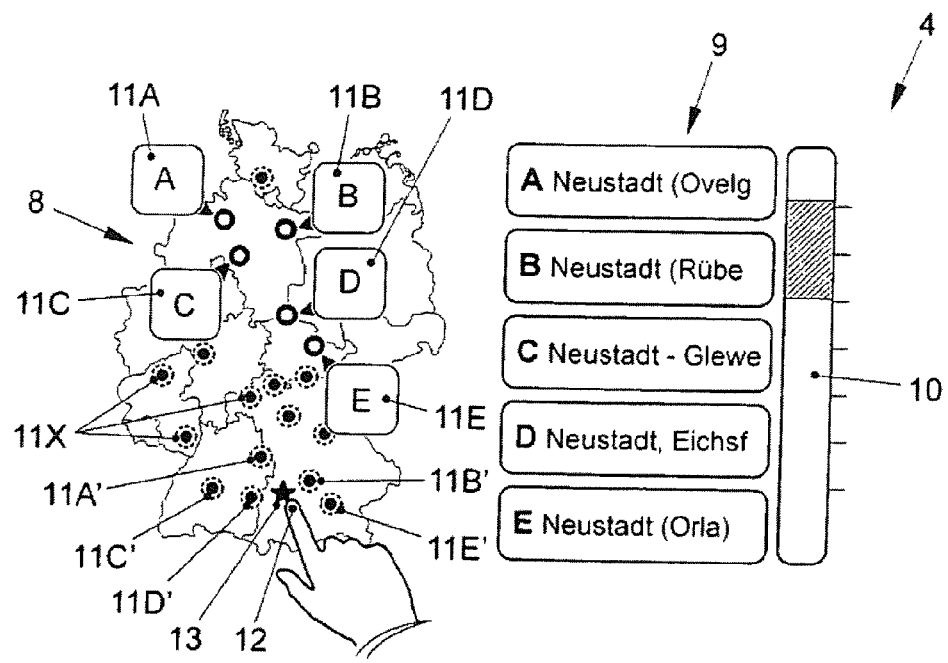
FIG. 3A shows a graphical presentation and a sequential list on a display surface during the selection of a position in the graphical presentation according to a disclosed embodiment.
Figure 3B:
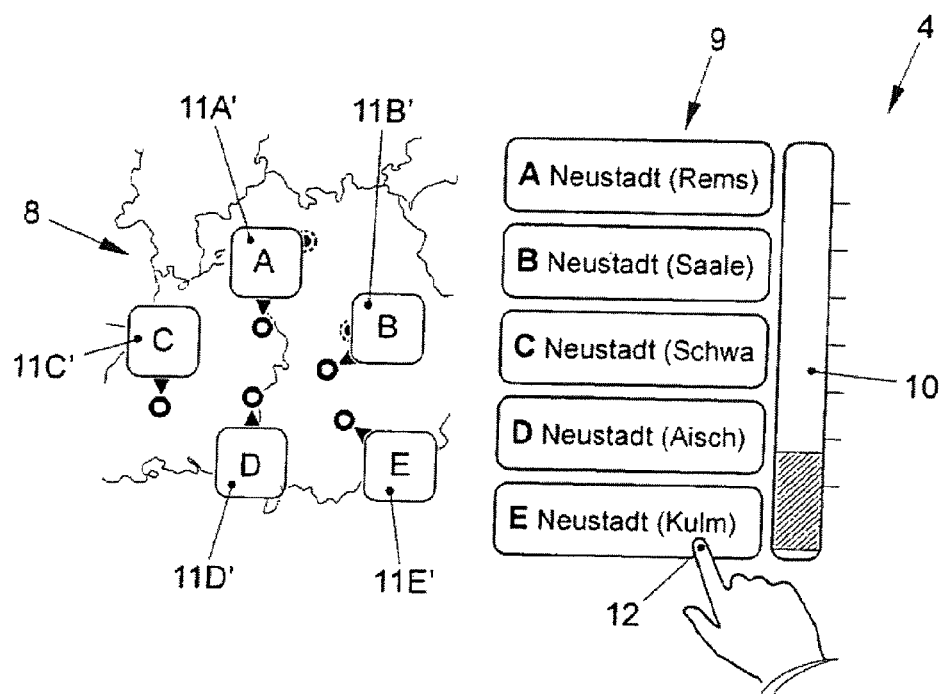
FIG. 3B shows the display contents of the display surface shown in FIG. 3A after the selection of a position in the graphical representation according to a disclosed embodiment.

The method will now be described with reference to an illustrative embodiment referring to FIGS. 3A and 3B. For this purpose, the apparatus described with reference to FIG. 2 can be used, in particular. FIG. 3A shows a map 8 and a text list 9 on a display surface 4 whilst a selection position 13 is selected on the map 8 in accordance with an illustrative embodiment. FIG. 3B shows the display contents obtained after the selection of the selection position 13 with a further operating action which is performed via the text list 9.

A user is assumed to look for a navigation route to "Neustadt". For this purpose, he is assumed to input, in a manner known per se, the search term "Neustadt" via the touch-sensitive surface 5 of the touchscreen or via other input means 6. He inputs the corresponding sequence of letters wholly or at least partially, e.g. via a keypad or via a selection menu. As an alternative, the input can also be done by voice command if the user interface is equipped correspondingly in a multimodal manner with a voice interface.

As a result, a set of objects 11A-11E, 11A'-11E', 11X are now imparted to him as search results. The number of search results, which may be large, can have been produced in many ways; a search term which is in fact multi-valued or ambiguous, an incomplete input, a faulty input or perhaps an input detected as faulty via the system. The set of objects 11A-11E, 11A'-11E', 11X are displayed in a text list 9 and, in dependence on the positions in each case allocated to the objects 11A-11E, 11A'-11E', 11X, on a map 8 on the display surface 4 as is shown in FIG. 3A.

In this context, the objects 11A-11E, 11A'-11E', 11X do not need to be shown precisely at the positions allocated to the objects. Due to the finite size and possible overlaps, the objects 11A-11E, 11A'-11E', 11X can also be displayed in an area around the corresponding position. Furthermore, not all objects 11A-11E, 11A'-11E', 11X need to be visible directly in the text list 9. In the case of a relatively large number, it is appropriate to display the text list 9 only partially in that the text list 9, for example, only has a limited number of entries, e.g. five. With the aid of a scroll bar 10 or buttons for turning pages (not shown), the user can then scroll through the text list 9 and look for the desired entry. The objects 11A-11E which are visible in the current display in text list 9 can be displayed emphasized with respect to the remaining objects 11A'-11E', 11X in map 8.

Because turning pages in a long text list 9 is cumbersome, the user can then select a selection position 13 in the map 8 by a first operating action. With his finger 12, e.g., he touches the display surface 4 on which the corresponding position 13 is displayed.

For this purpose, a metric is allocated to the positions on the map 8 by means of the control unit 7, so that a measure of distance can be determined between two positions. The objects 11A-11E, 11A'-11E', 11X are then successively included one at a time in a subset 11A'-11E' in dependence on the measure of distance between the position belonging to the respective object 11A-11E, 11A'-11E', 11X and the selection position 13. In this case, the measure of distance is formed from the geographic distance between the respective positions. As an alternative, the measure of distance can also be formed from a calculated travelling time which would be needed by the vehicle 1 from the selection position 13 to the positions allocated to the objects 11A-11E, 11A'-11E', 11X.

For example, the objects 11A'-11E' are included successively in ascending order of the measure of distance between the position of the object 11A-11E, 11A'-11E', 11X and the selected position in the subset when the measure of distance is smaller than a predetermined limit value, e.g. within a radius of 50 km around the selection position 13 or until a predetermined number is reached. This number does not need to be the same number as that in text list 9 of FIG. 3A.

In dependence on the selected position 13, the subset 11A'-11E' from the displayed set of the objects 11A-11E, 11A'-11E', 11X is now displayed emphasized in map 8. In this context, the scale of display of map 8 is automatically adapted to the new subset 11A'-11E' and the map section is shown enlarged. In addition, the display of the text list 9 is adapted to this selection so that this predetermined number of entries is now displayed there, as is shown in FIG. 3B.

The new presentation on the display surface 4 now facilitates the further operation via the text list 9. Text list 9 can still be displayed in a geographic sorting. Alternatively, however, text list 9 can also be displayed in accordance with a different sorting, e.g. alphabetically or in accordance with another parameter or attribute allocated to the objects 11A'-

11E', e.g. in accordance with the size of the town. An alphabetic display has the advantage that the user, due to the text reference, may now be able to orientate himself more easily with an alphabetic sorting than with a geographic sorting.

The user is now able to select the displayed object 11E' in the text list 9 by means of a second operating action in that he touches the corresponding area on the display surface 4 with his finger 12.

The method can also be performed iteratively in that a selection position 13 is selected several times in a multi-stage selection process, via which position the set of objects 11A-11E, 11A'-11E', 11X is restricted successively.

It has been found to be problematic in representing objects at their correct position on a map that, on the one hand, the objects to be represented are represented scattered over many positions on the map in such a manner that the user obtains little orientation and, on the other hand, some of these objects are located very densely close to one another.

In DE 10 2008 008 948 A1, a system architecture and a method for multi-modal information input is described. In this context, information contents can be changed or functions called up for an information display in that parts of a structured multi-word input are input by means of various modalities, particularly via speech, keyboard and gestures. In this manner, any part-information about the most suitable modality can be input so that the set of hits relating to the desired input can be restricted effectively by the system. Applications mentioned are, in particular, the selection of a navigation destination or of a music title.

DE 199 29 425 A1 describes a method for selecting a navigation destination. In this context, a list with navigation destinations is generated and one of a number of map sections defined in advance is selected from a geographic map so that the set of hits displayed can be reduced in the list. The navigation destinations in the list, belonging to the map section, can be marked optionally in the map section. The desired navigation destination can be selected from the map section or from the list.

In WO 03/100351, a method for inputting place names is described. For the case where the input can be allocated to at least two place names, at least one graphic identifying these places is displayed for selection of one of the two places. Such a graphic comprises, e.g., landmarks or coats of arms belonging to the respective place to provide for an easy visual differentiation.

LIST OF REFERENCE DESIGNATIONS

1 Vehicle
2 Navigation system
3 Data memory
4 Display surface
5 Touch-sensitive surface
6 Operating element
7 Control unit
8 Map
9 Text list
10 Scroll bar
11A-11E Objects
11A'-11E' Objects (subset)
12 Finger of the user
13 Selection position

The invention claimed is:

1. A method for providing a user interface, the method comprising:
receiving an input a search term via the user interface;
displaying a set of objects, as data, in a first sequential list and all of the objects in the set of objects in a first graphical presentation in response to the receipt of the input search term into the user interface;
selecting a position in the first graphical presentation in response to receipt of a first operating action received via the user interface;
selecting a subset of the displayed set of objects displayed in the first graphical presentation based on the position selected in the first graphical presentation in response to the receipt of the first operating action during display of the first graphical presentation via the user interface;
measuring a distance between the selected position in the first graphical presentation and a position of at least one object included in the set of objects displayed in the first graphical presentation;
generating the subset of objects for display in a second graphical presentation by selecting one or more objects included in the set of objects displayed in the first graphical presentation based on the measured distances between the one or more objects and the selected position in the first graphical presentation; and
generating the second graphical presentation and a second sequential list based on the generated subset of objects selected from the set of objects displayed in the first graphical presentation and automatically adapting a scale of display to change from the set of objects displayed in the first graphical presentation to the subset of those objects for display in the second graphical presentation, wherein the second graphical presentation is within the first graphical presentation,
wherein the set of objects displayed in the first sequential list or second sequential list are displayed in an emphasized manner with respect to the remaining objects displayed in the first graphical presentation or second graphical presentation.

2. The method of claim 1, wherein an object is included in the subset when the measure of distance is smaller than a predetermined limit value.

3. The method of claim 1, wherein the objects are included in the subset in ascending order of the measure of distance between the position of the object and the selected position until a predetermined number is reached.

4. The method of claim 1, wherein the sequential list is displayed sorted alphabetically after the selection of the subset.

5. The method of claim 1, the method further comprises, after a position has been selected in the first graphical presentation by the first operating action, selecting a displayed object of the subset in the sequential list in response to a second operating action.

6. The method of claim 1, wherein the objects are navigation destinations of a navigation system or selection objects of an infotainment application in a vehicle.

7. The method claim 6, wherein the measure of distance comprises at least one of a distance or a calculated travelling time.

8. The method of claim 1, wherein at least one of the graphical presentations or the sequential lists are presented on a touch-sensitive display surface and at least one of the first or a second operating action is carried out by touching the display surface in the area in which the graphical presentations or the sequential lists is displayed in each case.

9. The method of claim 1, the method further comprises, centering of the second graphical presentation based on the selected position.

10. The method of claim 1, wherein the generated subset of objects are represented very closely to one another in an undistorted manner.

11. The method of claim 1, wherein the generated subset of objects is located tendentially in one direction from the selected position.

12. An apparatus to provide a user interface, comprising:
a data memory to store a set of objects;
a display surface to display all of the objects in the set of objects in a first graphical presentation and a first sequential list;
input means to detect a first operating action for selection of a position on the display surface; and
a control unit which is connected to the data memory, the display surface and the input means, wherein, by the control unit, a subset from the displayed set of the objects in the first graphical presentation can be selected in the first sequential list based on the position selected in the first graphical presentation in response to receipt of the first operating action during display of the first graphical presentation via the input means,
wherein, the control unit is to determine a measure of distance between the selected position in the first graphical presentation and a position of at least one object included in the set of objects displayed in the first graphical presentation, and generate the subset of objects for display in a second graphical presentation by a selection of the at least one object included in the set of objects displayed in the first graphical presentation based on the measure of distance between the position belonging to the respective object and the selected position in the first graphical presentation,
wherein, the control unit is to generate the second graphical presentation and second sequential list based on the generated subset of objects selected from the set of objects displayed in the first graphical presentation and automatically adapt a scale of display to change from the set of objects displayed in the first graphical presentation to the subset of those objects for display in the second graphical presentation, wherein the second graphical presentation is within the first graphical presentation,
wherein the set of objects displayed in the first sequential list or second sequential list are displayed in an emphasized manner with respect to the remaining objects displayed in the first graphical presentation or second graphical presentation.

13. The apparatus of claim 12, wherein an object is included in the subset when the measure of distance is smaller than a predetermined limit value.

14. The apparatus of claim 12, wherein the objects are included in the subset in ascending order of the measure of distance between the position of the object and the selected position until a predetermined number is reached.

15. The apparatus of claim 12, wherein the sequential list is displayed sorted alphabetically after the selection of the subset.

16. The apparatus of claim 12, wherein, after a position has been selected in the first graphical presentation by the first operating action, a displayed object of the subset is selected in the sequential list by a second operating action.

17. The apparatus of claim 12, wherein the objects are navigation destinations of a navigation system or selection objects of an infotainment application in a vehicle.

18. The apparatus of claim 17, wherein the measure of distance comprises at least one of a distance or a calculated travelling time.

19. The apparatus of claim 12, wherein at least one of the graphical presentations or the sequential lists are presented on a touch-sensitive display surface and at least one of the first or the second operating action is carried out by touching the display surface in the area in which the graphical presentations or the sequential lists is displayed in each case.

* * * * *